United States Patent
Nanba

[11] 3,723,014
[45] Mar. 27, 1973

[54] PHOTOELECTRIC LIGHT MEASURING DEVICE

[75] Inventor: Yasuhiro Nanba, Toyokawa, Japan

[73] Assignee: Minolta Camera Kabushiki Kaisha, Osaka Prefecture, Japan

[22] Filed: Apr. 13, 1971

[21] Appl. No.: 133,495

[30] Foreign Application Priority Data

Apr. 13, 1970 Japan..............................45/31407
Aug. 29, 1970 Japan..............................45/86037
Aug. 29, 1970 Japan..............................45/86038

[52] U.S. Cl....................................356/226, 250/214
[51] Int. Cl....................G01j 1/44, H01j 39/12
[58] Field of Search...............356/226, 223, 202, 89; 250/214

[56] References Cited

UNITED STATES PATENTS 2,406,716  8/1946  Sweet..................................356/202
3,518,438  6/1970  Hart et al. ..........................356/223

Primary Examiner—Ronald L. Wibert
Assistant Examiner—Conrad Clark
Attorney—Craig, Antonelli, Stewart & Hill

[57] ABSTRACT

In a photoelectric light measuring device, a photoelectric transducer, such as photoconductive cell, is connected in series with a transistor, so that the logarithm of incident light on the cell can be graduated uniformly on an ordinary ammeter having a linear current-deflection characteristic, thereby enabling easy reading and affording a simple mechanism in a photometer or an automatic shutter speed control system, without adverse temperature dependency of the indication.

9 Claims, 7 Drawing Figures

FIG. 1 (PRIOR ART)
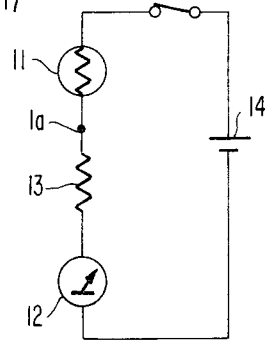
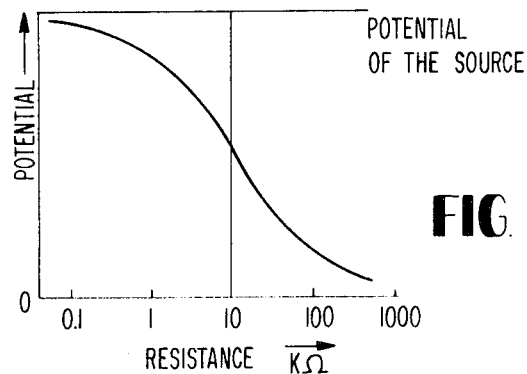
FIG. 2 (PRIOR ART)
FIG. 3 (PRIOR ART)
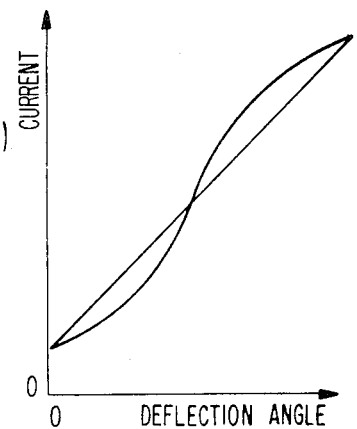
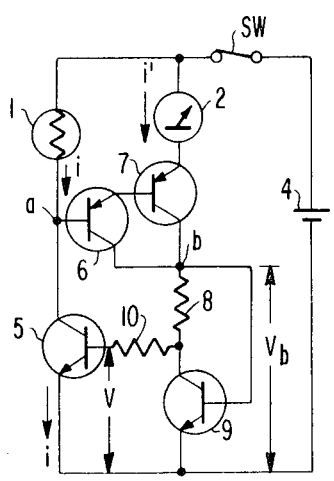
FIG. 4
INVENTOR
YASUHIRO NANBA

PHOTOELECTRIC LIGHT MEASURING DEVICE

BACKGROUND OF THE INVENTION

This invention relates to an improvement in a photoelectric light measuring device. This invention especially concerns a device having an even graduation of exposure value on its indicating dial.

In general, exposure controlling dials provided on cameras are graduated in the APEX ("additive photographic exposure" system defined in ASA standard) system which indicates the exposure value in powers of 2, and therefore, exposure meters are desired to be graduated in that system. In other words, said system has an indication of the logarithms of the base 2 of the brightness of a scene to be measured. On the other hand, in transducing light intensities into currents by photoconductive elements, such as cadmium sulfide elements, or by photocells, such as selenium cells, the output currents are approximately proportional to the intensities of the incident light, and therefore, the indication is to be made approximately in logarithms of the base 2 of said output currents of photoelectric transducers. Accordingly, in order to indicate said logarithms of the output current in uniform graduation in an ammeter which is connected in series with the transducer and an electric source, it is required to have a special ammeter wherein the pointer deflection angle is proportional to the logarithm of the output current. However, the manufacture of such a special ammeter is not easy.

The above-mentioned fact is explained by an example as follows. Generally, the conventional photoelectric exposure meter is so constituted as shown in the example illustrated by the circuit diagram in FIG. 1, wherein the photoconductive element 11 is connected in series with an ammeter 12, a resistor 13 and a d. c. electric source 14. In this circuit, the voltage drop across the ammeter 12 becomes proportional to the voltage across the resistor 13, and hence is proportional to the potential at point "1a." Thus, the potential of point "1a" is determined as a dividing ratio of the resistance of the resistor 13 over that of the series connection of the resistor 13 and the element 11.

Now, assuming that the resistor 13 is 10 KΩ, the relation between the resistance of the photoconductor 11 and the potential of the point "1a" is indicated in FIG. 2, wherein the abscissa is graduated as the logarithm of the resistance of the photoconductive element 11 and the ordinate indicates the potential of the point "1a." Since the current in the ammeter 12 is proportional to the potential at the point "1a" as aforementioned, the relation between the current of the photoconductive element 11 and the resistance thereof provides a characteristic similar to that of FIG. 2. As is shown in FIG. 2, the curve has a point of inflection at the resistance of 10 KΩ of the photoconductive element 11; namely, the point where the resistance of the element 11 and that of the resistor 13 are equal.

Accordingly, a linear relation between the logarithm of the resistance of the element 11 and the current of the ammeter 12 is obtainable only in a limited region on either side of and adjacent to the resistance at which the incident light gains such an intensity to cause the resistivity of the photoconductive element 11 to become equal to 10 KΩ. Therefore, an attempt to widen the linear range was made by employing as the ammeter 12 an ammeter having means to compensate for the non-linear characteristic of the photoconductive element 11 by providing and S-shaped relation between current and pointer-deflection-angle, as shown in FIG. 3, wherein the abscissa indicates the deflection angle of the pointer of the ammeter and the ordinate indicates the current of the ammeter. However, as stated already, it is hardly possible to control the response of an ammeter to have an ideal characteristic as indicated in FIG. 3.

SUMMARY OF THE INVENTION

This invention provides a photoelectric light measuring device in which a current flowing through an ammeter is proportional to the logarithm of incident light on its photoelectric transducer.

This invention further provides a photoelectric light measuring device of the type described which is devoid of temperature-dependency.

This invention further provides a photoelectric light measuring device of the type described having a uniform graduation for exposure values or for the logarithm of brightness, on the ordinary ammeter of linear characteristic.

This invention further provides a photoelectric light measuring device of the type described having a characteristic such that the pointer of the ammeter stops quickly without a vibrating motion.

This invention further provides a photoelectric light measuring device of the type described having an indicating means for over-range deflections.

This invention utilizes a known characteristic of a transistor wherein the collector current of the transistor has a linear relationship to an exponential function of the base voltage of the transistor. Since the logarithm of the collector current of the transistor is in linear relation to the base voltage thereof, by controlling said base voltage in such a manner that said collector current becomes equal to an output current of a photoelectric transducer connected thereto, the base voltage to the transistor will have a value which is a logarithm of the output of the photoelectric transducer. Accordingly, by indicating, with the usual ammeter or voltmeter having a linear characteristic, a value proportional to said base voltage of the transistor, the aforementioned objects of the invention can be attained.

BRIEF DESCRIPTION OF THE DRAWINGS

FIG. 1 is a schematic circuit diagram of one example of the conventional photoelectric measuring device;

FIG. 2 is a chart indicating the relation between the potential at the point "a" and the resistance of the photoelectric transducer illustrated in FIG. 1.

FIG. 3 is a chart indicating the required characteristic of an ammeter, wherein the abscissa indicates the deflection angle of the pointer of the ammeter and the ordinate indicates the current of the ammeter;

FIG. 4 is a schematic circuit diagram of one example of the present invention;

Figure 5:
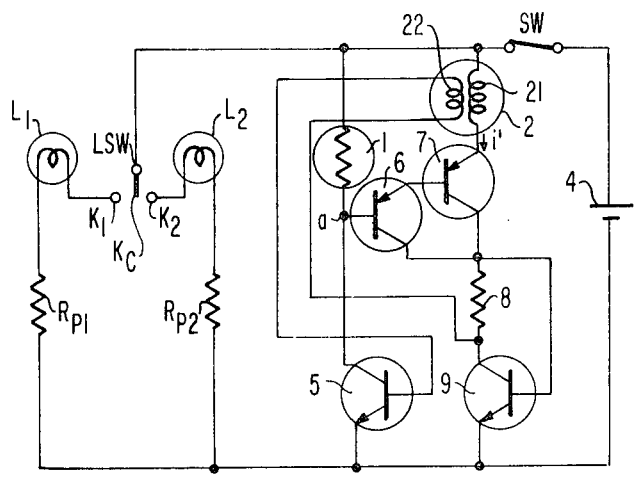
FIG. 5 is a schematic circuit diagram of another example of the present invention.

DETAILED DESCRIPTION OF THE INVENTION:

The invention will be more fully understood by reference to the following detailed description of the exemplary embodiments of the invention.

In FIG. 4, which illustrates the electric circuit diagram of one embodiment of the present invention, a photoelectric transducer 1, for instance, a photoconductive element, such as a cadmium sulfide element, is connected in series with the collector-emitter circuit of a logarithm-transducing transistor 5. The series connection of said photoelectric transducer 1 and said transistor 5 is connected across a d. c. voltage source 4 through a switch SW. One end of an ordinary moving-coil type ammeter 2, having linear characteristic between its current $i'$ and the deflection angle of the pointer, is connected to the positive end of said photoelectric transducer 1. The other end of the meter 2 is connected to the emitter of a transistor 7 which forms a second transistor of a Darlington circuit consisting of said transistor 7 and a first transistor 6. Base of the first transistor 6 is connected to the connecting point "a" between the photoconductive transducer 1 and the collector of the transistor 5. Common-collectors connection point "b" of the Darlington circuit is connected through a resistor 8 to the collector of a temperature-compensating transistor 9, which has the same characteristics as those of the transistor 5. The emitter of the transistor 9 is connected to the emitter of the transistor 5; the base of the transistor 9 is connected to the point "b"; and the collector of the transistor 9 is connected through the coupling impedance 10 to the base of the transistor 5.

In the device constituted as described above, an electric potential at the point "a," namely, the voltage between the collector and the emitter of the transistor 5, is amplified by the Darlington circuit formed by transistors 6 and 7, and the amplified output voltage is divided by the series connection of the resistor 8 and the transistor 9, imparting the divided voltage to the base of the transistor 5 through the coupling impedance 10. Accordingly, if the potential at the point "a" rises on account of an increase of incident light to the photoelectric transducer 1, the output current flowing through the resistor 8 and the transistor 9 increases, and therefore, the potential at the base of the transistor 5 rises thereby decreasing the collector-emitter resistance of the transistor 5. On account of such a decrease in the collector-emitter resistance of the transistor 5 the potential at the point "a" falls. Thus, the potential at "a," as well as the voltage across the photoelectric transducer 1 remains unchanged due to a negative feedback function of the circuit.

Since the voltage across the photoelectric transducer is constant as mentioned above, $$i = I_0 \cdot 2 \gamma \cdot E \tag{1}$$

wherein
  $i$: current of the photoelectric transducer 1,
  $I_0$: a constant inherent in each transducer,
  $\gamma$: a constant inherent in each transducer, and
  $E$: exposure value for use in photography.

As is known, in general, a transistor has such a character that the logarithm of its collector current varies in linear relation to its base voltage, and accordingly $$V = A \cdot \log i_5 + B,$$

wherein
  $V$: base voltage of the transistor 5,
  $A$: a constant inherent in each transistor,
  $B$: a constant inherent in each transistor, and
  $i_5$: collector current of the transistor 5.

Since the base current of the first transistor 6 of the Darlington circuit is negligible, $i_5 = i$, and accordingly, $$V = A \cdot \log i + B \tag{2}$$

By substituting $i$ of the equation (1) for $i$ of the equation (2), $$V = A \cdot (\log I_0 + \gamma \cdot E \log 2) + B$$
$$= A \cdot \log I_0 + A \cdot \gamma \cdot E \log 2 + B \tag{3}$$

or $V = C_1 + C_2 \cdot E \tag{3}'$, wherein $C_1$ and $C_2$ are constants. This equation implies that the base voltage of the transistor 5 varies in linear relation to the exposure value.

Since the base currents of respective transistors 5, 6 and 9 are negligibly small, the collector voltage of the transistor 9 can be considered equal to the base voltage $V$ of the transistor 5, and the current $i'$ flowing through the ammeter 2 can be considered equal to the current flowing through the resistor 8 or transistor 9, and therefore, $$V = V_b - R' \cdot i', \tag{4}$$

wherein $V_b$:
  base potential of the transistor 9, which is also the potential of the point "b," and
  $R'$: resistance of the resistor 8.

Since the transistors 5 and 9 have the same characteristics, the constants A and B of the transistor 5 also apply to the transistor 9, and therefore, like equation (2), $$V_b = A \cdot \log i' + B \tag{5}$$

By substituting $V_b$ of the equation (5) for the $V_b$ of the equation (4), $$V = A \cdot \log i' + B - R'i' \tag{6}$$

Then, from the equations (3) and (6), $$i' = A/R' \cdot \log i'/I_0 - E \cdot A \cdot \gamma/R^\circ \cdot \log 2 \tag{7},$$

or $$i' = A/R' \cdot \log i' - A/R' \cdot \log I_0 - E \cdot A \cdot \gamma/R' \cdot \log 2 \tag{7}'.$$

Since a change of the first term $A/R' \cdot \log i'$ is negligibly small in comparison with the corresponding change of $i'$, the first term can be considered as a constant $C_3$, and therefore, $$i' = C_3 - C_4 - E \cdot C_5 \tag{8}$$

wherein $C_4$ and $C_5$ are constants.

The equations (7), (7') or (8) imply that the current $i'$ of an ordinary linear ammeter 2 varies in linear relation to the exposure value $E$. As is apparent from the equations (7), (7') or (8), the above-mentioned linear relation exists regardless of the value of 8. It is also apparent from these equations that the constant B of the transistor 5 is eliminated. Although the constant A of the transistor 5 still remains in the equation (7) or (7'), the temperature dependency of the circuit due to temperature-dependency change of the constant A can be eliminated by employing a compensating resistor having a suitable temperature characteristic, for instance, a thermistor and/or a copper-wire resistor for the resistor 8.

As can be understood from the foregoing description, according to the present invention, the dial of the indicator can be graduated uniformly for the exposure value of the APEX system by employing an ordinary ammeter having a linear characteristic, without adverse temperature dependency of the indication.

Figure 6:
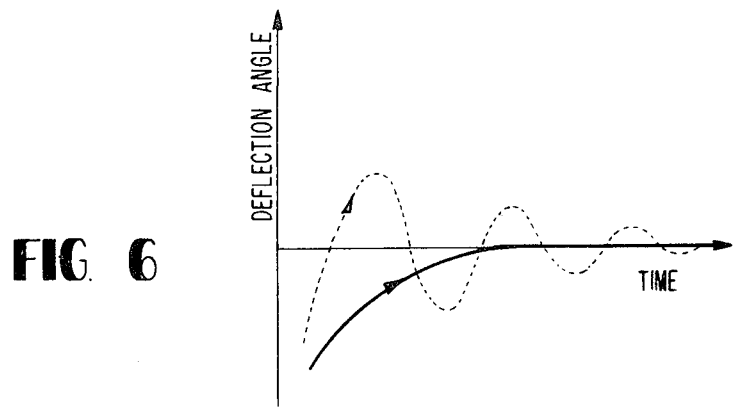
FIG. 6 is a diagram indicating transient motion of the pointer of an ammeter.
Figure 7:
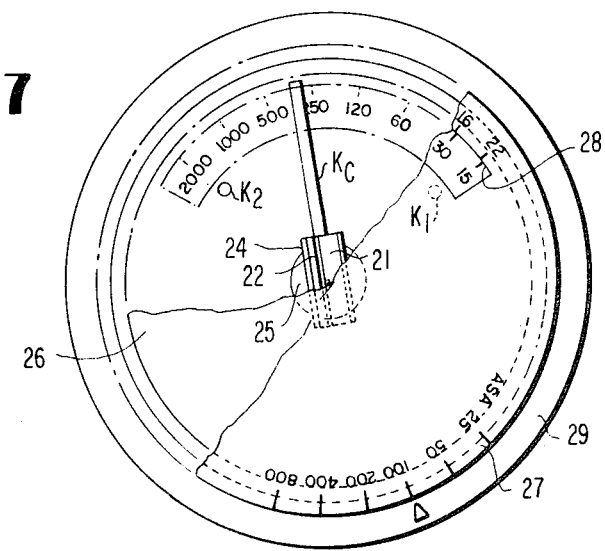
FIG. 7 is a front elevational view of the ammeter with portions thereof broken away to illustrate interior details.

FIGS. 5 to 7 illustrate a practical example embodying the principle of the present invention, as described above. In FIG. 5, which illustrates the electric circuit of this embodiment, the principal parts are almost the same as those explained with reference to FIG. 4, and the same reference numerals and reference characters used to designate corresponding elements in FIG. 4 apply to the example of FIG. 5. The mechanical construction of the ammeter is shown in FIG. 7. In the device of this practical example, the ammeter 2 comprises a primary coil 21 and a secondary coil 22 electromagnetically coupled as well as mechanically secured to said primary coil 21.

The primary coil 21 is connected between the switch SW and the emitter of the transistor 7 so as to drive the pointer 23 secured to a coil frame 24 of the primary coil 21 and the secondary coil 22 in response to the input current $i'$ to the meter 2. The secondary coil 22 is connected as a coupling impedance between the base of the transistor 5 and the collector of the transistor 9.

When the input current $i'$ changes, the pointer secured to the coil frame 24 is apt to move in a vibrating manner, as indicated by the dotted curve in FIG. 6, and by such motion a secondary voltage is induced in the secondary coil 22. Since such secondary voltage is applied to the base of the transistor 5, by appropriately selecting the turn ratio between the primary and secondary coils 21 and 22, and by selecting the polarity of the connection of the secondary coil 22, a suitable negative feedback to reduce the vibrating motion of the pointer can be generated in the circuit. In this way the transient vibration of the pointer can be eliminated, and therefore, the pointer stops in a shorter time, as indicated by the solid curve in FIG. 6, enabling quicker reading of the meter.

Moreover, the device has a pair of indication lamps $L_1$ and $L_2$, for respective indications of upper and lower over-range-deflections of the pointer. One end of the lamps $L_1$ and $L_2$ is connected to the contacts $K_1$ and $K_2$ of a limit switch LSW, respectively, and the other end of the lamps $L_1$ and $L_2$ is connected through respective resistors $R_{p1}$ and $R_{p2}$ to the negative terminal of the power source 4. The moving contact $K_c$ is connected to the positive terminal of the power source 4 through the switch SW. The indication lamps $L_1$ and $L_2$ are located, for instance, to be watched in a view-finder of a photographic camera or on a face of an exposure meter so as to indicate the upper or lower over-range deflection of the pointer.

The mechanical construction of the limit switch LSW is such that the moving contact $K_c$ touches the contact $K_1$ for indication of the upper over-range deflection when the incident light exceeds the upper limit for the range, and the moving contact $K_c$ touches the contact $K_2$ for indication of the lower over-range deflection when the incident light exceeds the lower limit for the range.

An example of the mechanical construction is illustrated in FIG. 7, wherein the housing 29 contains an inner permanent magnet 25. The coil frame 24 has the primary coil 21 and the secondary coil 22 and is pivoted rotatably around the inner magnet 25. The upper limit contact $K_1$, and the lower limit contact $K_2$ are also included within the housing 29. The moving contact $K_c$ is fixed to the coil frame 24 so as to touch the contacts $K_1$ and $K_2$, respectively, at the upper end and lower ends of the deflection range. The pointer, i.e., the moving dial 26 having exposure-time graduations is secured to the coil frame 24 so as to rotate under the setting dial 27 having aperture stop graduations and film sensitivity graduations. Said exposure-time graduations can be read through a window 28 provided in the setting dial 27.

While I have shown and described several embodiments in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are obvious to one or ordinary skill in the art.

What is claimed is:

1. A photoelectric light measuring device comprising:
   a photoelectric transducer,
   a transistor for logarithmic conversion having its collector connected to said photoelectric transducer, and
   an amplifier for feeding output current to a load, said load providing an output representative of the amount of light received by said photoelectric transducer, said amplifier having an input terminal to receive a control signal connected to the connection point between said photoelectric transducer and said transistor and an output terminal connected to the base of said transistor through an impedance.

2. A photoelectric light measuring device as defined in claim 1, which further comprises a second transistor for compensation of the temperature dependency of said first transistor connected to the first transistor so that the collector-emitter voltage of the second transistor becomes substantially equal to the base-emitter voltage of the first transistor, said first and second transistors having substantially the same characteristics.

3. A photoelectric light measuring device as defined in claim 1, which further comprises, as said load for said amplifier, an ammeter for indicating exposure quantity.

4. A photoelectric light measuring device as defined in claim 4, which further comprises, as said load for said amplifier, an ammeter for indicating exposure quantity.

5. A photoelectric light measuring device as defined in claim 3, wherein said ammeter has a primary coil and a secondary coil on a moving coil frame, the secondary coil being electromagnetically coupled to the primary coil connected in the output circuit of said amplifier and being connected between the collector of the second transistor and the base of the first transistor.

6. A photoelectric measuring device as defined in claim 5, wherein said ammeter contains an over-range limit switch consisting of fixed upper and lower limit contacts and a moving contact mechanically linked to said coil frame, and upper and lower over-range indication lamps, one end of each of said lamps being respectively connected to the upper limit contact and the lower limit contact and the other end of each of said lamps being connected in common to one end of an electric source, said moving contact being connected to the other end of the electric source.

7. A photoelectric light measuring device as defined in claim 4, wherein said ammeter has a primary coil and a secondary coil on a moving coil frame, the secondary coil being electromagnetically coupled to the primary coil connected in the output circuit of said amplifier, and being connected between the collector of said second transistor and the base of said first transistor.

8. A photoelectric light measuring device as defined in claim 4, wherein said ammeter has a primary coil and a secondary coil on a moving coil frame, the secondary coil being electromagnetically coupled to the primary coil connected in the output circuit of said amplifier and being connected between the collector of the second transistor and the base of the first transistor.

9. A photoelectric measuring device as defined in claim 8, wherein said ammeter contains an over-range limit switch consisting of fixed upper and lower limit contacts and a moving contact mechanically linked to said coil frame, and upper and lower over-range indication lamps, one end of each of said lamps being respectively connected to the upper limit contact and the lower limit contact and the other end of each of said lamps being connected in common to one end of an electric source, said moving contact being connected to the other end of the electric source.

* * * * *